Patented Sept. 20, 1949

2,482,208

UNITED STATES PATENT OFFICE 2,482,208

PROCESS FOR MAKING STYRENE AND ITS DERIVATIVES

William M. Quattlebaum, Jr., Charleston, and Walter J. Toussaint, South Charleston, W. Va., assignors to Carbide and Carbon Chemicals Corporation, a corporation of New York No Drawing. Application July 9, 1946, Serial No. 682,298

9 Claims. (Cl. 260—650)

In our copending application, Serial No. 458,736, filed September 17, 1942, entitled "Process for making olefines," now Patent 2,407,291, of which this application is a continuation-in-part, we have shown that carbonyl compounds capable of keto-enol tautomerism are deoxygenated to the corresponding olefines when they are passed over a silica gel catalyst together with an alcohol capable of dehydrogenation to a carbonyl compound, the alcohol being simultaneously reduced to an aldehyde or ketone. In our previous application, we specifically applied this reaction to the production of mono- and diolefines, including the formation of butadiene from crotonaldehyde and ethanol, but we also demonstrated that styrene could be formed from acetophenone and ethanol by this reaction. We have now found that the reaction also is applicable to the production of substituted styrenes from substituted acetophenones.

According to the present invention, acetophenone and substituted acetophenones, such as the various chloroacetophenones, together with primary or secondary alcohols, are passed over a silica gel catalyst to form styrene or substituted styrenes, such as the chlorostyrenes, and a carbonyl compound corresponding to the dehydrogenation product of the alcohol. The deoxygenation reaction of this invention may be illustrated by the following general equation:

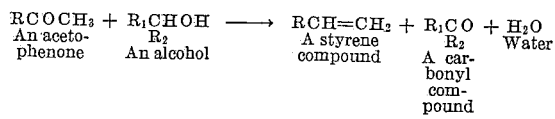

where R is an aromatic radical having a single benzenoid ring, $R_1$ is an alkyl radical and $R_2$ is hydrogen or an alkyl radical. As examples of acetophenones may be mentioned acetophenone, ortho, meta, and para chloroacetophenone, the various dichloroacetophenones, the trichloroacetophenones, ortho, meta, and para methyl acetophenone, and the various dimethyl acetophenones. Any of the typical primary or secondary aliphatic alcohols may be utilized in the deoxygenation reaction, such as ethanol, isopropanol, butanol, secondary butyl alcohol, pentanol, hexanol and the like.

In general, it is preferable to employ in the reaction a substantial molar excess of the alcohol, for instance three to nine moles of the alcohol per mole of the acetophenone. After passage over the catalyst, the unchanged alcohol may be recovered and recycled. Most of the alcohol consumed is converted to the corresponding carbonyl compound, which is usually more valuable than the alcohol. If not, the carbonyl compound can be easily hydrogenated to form the alcohol. Very little alcohol is lost by dehydration to an olefine, although secondary alcohols are somewhat more easily dehydrated than primary alcohols.

It is not essential to use pure acetophenones in the deoxygenation reaction; mixtures of acetophenones and aromatic alcohols, such as may be obtained by oxidizing ethylbenzene or its derivatives are entirely suitable.

The temperature at which the deoxygenation reaction may be carried out may vary from about 200° to about 500° C., with the preferred temperatures being 300°–325° C. to 375°–400 C. In general, the yield increases with the temperature employed, but it is preferable to operate at temperatures lower than those at which the maximum yield is obtainable, as shown in the examples, in order to avoid side-reactions and to increase the efficiency of the process. The time of contact of the reactants with the catalyst may be varied, but, as a rule, a feed rate of about 0.5 to 1.5 volumes of liquid reactants per volume of catalyst per hour is suitable. The reactants are, of course, vaporized before they pass over the catalyst. Thus, the time of contact of the reactant vapors with the catalyst may be about 1 to 4 seconds.

The following procedure was followed in carrying out the deoxygenation reactions of the specific examples.

GENERAL PROCEDURE

The reaction chamber consisted of a vertical, one-inch, stainless steel tube in which 300 c. c. of acid-washed commercial silica gel catalyst of suitable particle size, usually 4 x 8 mesh, were placed. The reaction zone was preceded by a preheating section containing 150 c. c. of "Filtros," an inert form of silica. The reaction tube was heated by means of a jacket containing a heating fluid.

In starting a run the temperature of the catalyst bed was raised slowly, commencing at about 250° C., while a mixture of the acetophenone and the alcohol was introduced usually at a rate of 300 c. c. of liquid per hour at the top of the tube. The vapors emerging at the bottom of the tube were condensed, and a sample of the product titrated at intervals to determine the amount of unsaturation, and hence the amount of reaction. When a temperature was reached at which a good conversion to the styrene compound was indicated, the run was continued at this temperature using weighed amounts of starting materials. The product formed during the quantitative part of the run was condensed and carefully analyzed by distillation.

Example 1.—Styrene

To 1043 grams of an acetophenone-methylphenylcarbinol mixture (containing 69% by weight of the ketone), obtained by oxidizing ethylbenzene, were added 2644 grams of ethanol containing small amounts of water (about 7%) and acetaldehyde (about 1%). The resulting mixture, which had a molar ratio of ethanol to ketone of about 9 to 1, was vaporized and passed at the rate of 300 c. c. per hour over 300 c. c. of acid-washed commercial silica gel maintained at a temperature of 350° C. in a one-inch tube.

The vapors from the tube were condensed, and the product distilled in a fractionating still, water (600 grams) and heptane (850 grams) being added at the start to facilitate isolation of the styrene. Acetaldehyde was obtained first, in an amount corresponding in moles approximately to the number of moles of acetophenone consumed. A constant boiling mixture of water, ethanol and hexane then distilled, and the lower layer of the two-layer condensate thus obtained was removed continuously until the mixture was free of ethanol and water. Continuation of the distillation under reduced pressure gave, after removal of the remaining heptane, a styrene fraction boiling at 54 to 55° C. at 30 mm. with a refractive index ($n_D^{30}$) of 1.5411 and a purity as determined by freezing point (assuming the impurity to be ethylbenzene) of 99.7%. Finally a fraction of unreacted acetophenone and methylphenylcarbinol was re-recovered at 78 to 80° C. at 10 mm. It consisted largely of acetophenone, most of the carbinol in the original mixture having undergone dehydration to styrene.

By taking into account small amounts of material present in mid-fractions, 402 grams of styrene and 536 grams of ketone-carbinol mixture were obtained in the distillation. This corresponds to a yield of styrene of 45% of the theoretical with an efficiency of 92%, both based on the acetophenone-methylphenyl carbinol mixture. The efficiency is defined as the ratio of the moles of acetophenone and methylphenyl carbinol converted to styrene to the total moles of ketone and carbinol reacted.

Example 2.—Styrene

A mixture of 120 grams of acetophenone and 203 grams of ethanol (91%) was passed through 300 c. c. of purified silica gel in 4.5 hours. The reaction temperature was 350° C. The product was distilled with water, and somewhat more than 30 grams of styrene was obtained.

Example 3.—Monochlorostyrene

Six gram-moles of chlorophenyl methyl ketone and 24 gram-moles of ethanol containing small amounts of water and acetaldehyde were vaporized at the rate of 330 c. c. of liquid per hour and the vapors were passed over 300 c. c. of acid-washed silica gel contained in a one-inch tube and maintained at 350° C. Distillation of the condensate from the tube gave, after removal of acetaldehyde, water, and unused ethanol, 1.83 gram-moles of chlorostyrene (B. P. 53–54° C. at 5 mm.; $n_D^{30}$ 1.5604) which represents a yield of 31% of the theoretical. There were recovered 3.94 gram-moles of unreacted ketone (B. P. 90–93° C at 5 mm.; $n_D^{30}$ 1.5515), indicating an efficiency of 89%.

Example 4.—Monochlorostyrene

A mixture of 20 gram-moles of isopropanol and 5 gram-moles of chlorophenyl methyl ketone was passed during 7.2 hours over 300 c. c. of silica gel maintained at a temperature of 300° C. Propylene was formed as a by-product to the extent of 3.5 gram-moles, the relative amount of olefine formed being considerably larger than in the previous example. After removal of acetone, water, and excess isopropanol from the reaction product by distillation, 1.55 moles of chlorostyrene and 3.29 moles of unreacted ketone were recovered. The yield and efficiency were thus 31% and 91% respectively.

Example 5.—Dichlorostyrene

A mixture of 2,5-dichlorophenyl methyl ketone and ethanol in a molar ratio of 1 to 9 was vaporized at the rate of 210 c. c. per hour and the vapors passed over 300 c. c. of silica gel maintained at 350° C. The gaseous products from the reaction tube were quenched in a receiver cooled with dry ice. Subsequent distillation yielded, after removal of acetaldehyde, water, and unreacted ethanol, 2,5-dichlorostyrene (B. P. 60° C. at 1.5 mm.; $n_D^{30}$ 1.5737) and recovered ketone (B. P. 74° C. at 1 mm.; $n_D^{30}$ 1.5564). A yield of 46% of the theoretical was obtained.

Example 6.—Dichlorostyrene

To 1134 grams of a mixture of about equal parts of dichlorophenyl methyl ketone and the corresponding carbinol (obtained by oxidizing an isomeric mixture of ethyldichlorobenzenes) was added 1320 grams of ethanol containing small amounts of acetaldehyde and water. The resulting solution, having an ethanol-ketone ratio of approximately 9 moles to 1, was vaporized at the rate of 300 c. c. per hour and the vapors, along with nitrogen at the rate of 53 liters per hour, were passed over 300 c. c. of silica gel maintained at 350° C. Distillation of the quenched product in the presence of 0.2 percent of o-nitrophenol, a polymerization inhibitor, gave 330 grams of an isomeric mixture of dichlorostyrenes (B. P. 66–68° C. at 2.5 mm.; $n_D^{30}$ 1.576) and 704 grams of ketone-carbinol mixture (B. P. 95–105° C. at 2.5 mm.; $n_D^{30}$ 1.558) somewhat reduced in carbinol content. A yield of 32% and an efficiency of 85% both based on the original ketone-carbinol mixture, were calculated from the above figures.

Styrene and the chlorostyrenes prepared in accordance with the above examples are useful materials in the preparation of synthetic resins. The process of this invention is particularly valuable for producing styrene and its derivatives for this purpose since the monomers are of high purity. The deoxygenation reaction is a particularly useful reaction for producing the chlorostyrenes since these materials are difficult to prepare by the usual methods which are employed for producing styrene. The commercial methods employed for making styrene involve the hydrogenation of acetophenone and subsequent dehydration of the carbinol or the dehydrogenation of ethylbenzene. The former process is not suitable for converting the chloroacetophenones to chlorostyrenes because the chloro compounds poison the hydrogenation catalyst. On the other hand, the silica gel catalysts of this invention are not subject to poisoning. The dehydrogenation of the ethylchlorobenzenes is not a satisfactory process because the separation of the chlorostyrenes from the ethylchlorobenzenes is extremely difficult. This is because of the presence of isomers, the narrow range of boiling points of the materials to be separated, and the readiness of the chlorostyrenes to polymerize.

As compared to the known process of making styrene from acetophenone, the present process has the advantage that it eliminates the hydrogenation step.

Modifications of the invention, other than as described in the specific examples, may be made without departing from the scope of the invention as defined in the appended claims.

We claim:

1. Process for making a styrene compound of the group consisting of styrene and chlorostyrenes which comprises passing the vapors of one of the group consisting of acetophenone and ring-substituted chloroacetophenones and an aliphatic monohydric alcohol capable of dehydrogenation to a carbonyl compound over a silica gel catalyst at an elevated temperature and recovering from the reaction products a styrene compound and an aliphatic carbonyl compound corresponding to the dehydrogenation product of said alcohol.

2. Process for making styrene which comprises passing the vapors of acetophenone and an aliphatic monohydric alcohol capable of dehydrogenation to a carbonyl compound over a silica gel catalyst at a temperature of about 200° to about 500° C. and recovering from the reaction products styrene and an aliphatic carbonyl compound corresponding to the dehydrogenation product of said alcohol.

3. Process for making a monochlorostyrene which comprises passing the vapors of a ring-substituted monochloroacetophenone and an aliphatic monohydric alcohol capable of dehydrogenation to a carbonyl compound over a silica gel catalyst at a temperature of about 200° to about 500° C. and recovering from the reaction products a monochlorostyrene and an aliphatic carbonyl compound corresponding to the dehydrogenation product of said alcohol.

4. Process for making a dichlorostyrene which comprises passing the vapors of a ring-substituted dichloroacetophenone and an aliphatic monohydric alcohol capable of dehydrogenation to a carbonyl compound over a silica gel catalyst at a temperature of about 200° to about 500° C. and recovering from the reaction products a dichlorostyrene and an aliphatic carbonyl compound corresponding to the dehydrogenation product of said alcohol.

5. Process for making a chlorostyrene which comprises passing the vapors of a ring-substituted chloroacetophenone and a chlorophenyl methyl carbinol together with an aliphatic monohydric alcohol capable of dehydrogenation to a carbonyl compound over a silica gel catalyst at an elevated temperature and recovering from the reaction products a chlorostyrene and an aliphatic carbonyl compound corresponding to the dehydrogenation product of said alcohol.

6. Process for making styrene which comprises passing the vapors of acetophenone and ethanol over a catalyst comprising silica gel at a temperature of about 300° to about 400° C. and recovering from the reaction products styrene and acetaldehyde.

7. Process for making a chlorostyrene which comprises passing the vapors of a ring-substituted chloroacetophenone and ethanol over a catalyst comprising silica gel at a temperature of about 300° to about 400° C. and recovering from the reaction products a chlorostyrene and acetaldehyde.

8. Process for making a monochlorostyrene which comprises passing the vapors of a ring-substituted monochloroacetophenone and ethanol over a catalyst comprising silica gel at a temperature of about 300° to about 400° C. and recovering from the reaction products a monochlorostyrene and acetaldehyde.

9. Process for making a dichlorostyrene which comprises passing the vapors of a ring-substituted dichloroacetophenone and ethanol over a catalyst comprising silica gel at a temperature of about 300° to about 400° C. and recovering from the reaction products a dichlorostyrene and acetaldehyde.

WILLIAM M. QUATTLEBAUM, JR.
WALTER J. TOUSSAINT.

REFERENCES CITED

The following references are of record in the file of this patent:

UNITED STATES PATENTS

| Number | Name | Date |
|---|---|---|
| 1,877,203 | Schoeller et al. | Sept. 13, 1932 |
| 2,204,978 | Bartlett | June 18, 1940 |
| 2,406,319 | Brooks et al. | Aug. 27, 1946 |
| 2,407,291 | Quattlebaum et al. | Sept. 10, 1946 |

FOREIGN PATENTS

| Number | Country | Date |
|---|---|---|
| 538,353 | Great Britain | July 31, 1941 |